April 30, 1946.  D. S. FAHRNEY  2,399,216
FLYING AIRCRAFT CARRIER
Filed Oct. 10, 1941  2 Sheets-Sheet 1

INVENTOR
D. S. FAHRNEY
BY
ATTORNEY

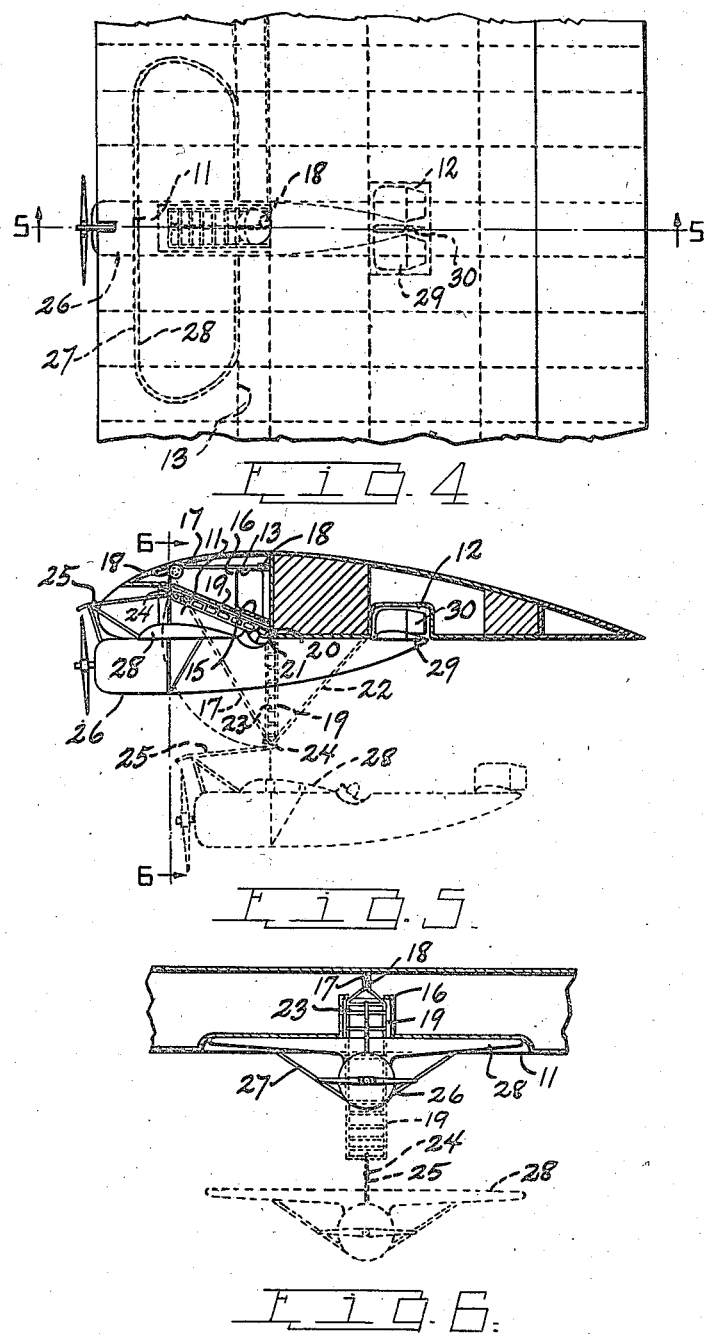

Patented Apr. 30, 1946

2,399,216

UNITED STATES PATENT OFFICE 2,399,216

FLYING AIRCRAFT CARRIER

Delmer S. Fahrney, United States Navy

Application October 10, 1941, Serial No. 414,430

4 Claims. (Cl. 244—2)

(Granted under the act of March 3, 1883, as amended April 30, 1928; 370 O. G. 757)

The present invention relates to a flying aircraft carrier of the heavier-than-air type.

It is an object of the present invention to provide an improved type of aircraft to carry a plurality of smaller aircraft.

Another object of the present invention is the provision of means in the wings of an aircraft carrier for stowing portions of smaller heavier-than-air ships.

A still further object of the present invention is the provision of a plurality of recesses in the wings of the aircraft carrier or mother ship in which may be nested smaller aircraft.

A still further object of the present invention is the provision of means in the wings of the aircraft carrier for egress and ingress to the recesses and to the fuselage of the aircraft carrier.

A still further object of the present invention is the provision of means in the wings of the mother ship for raising the smaller ships into said recesses, or lowering the smaller ships for launching from the mother craft.

A still further object of the present invention is the provision of a harness on the smaller aircraft provided with means adapted for engagement with housing and launching apparatus.

Other objects and advantages of the present invention will be more apparent from the following description and claims when read in conjunction with the accompanying drawings forming part thereof, wherein like numerals refer to like parts throughout, and in which:

Fig. 4 is an enlarged fragmentary portion of one of the wings of the mother craft and illustrating in dotted lines one of the smaller airplanes, and trapeze for raising and lowering the smaller airplanes.

Fig. 5 is a sectional view taken on line 5—5 of Fig. 4 and illustrating the mechanism for raising and lowering the smaller aircraft, the tail of the smaller aircraft, shown, housed in a recess, the trapeze and smaller craft shown in lowered position in dotted lines.

Fig. 6 is a vertical fragmentary sectional view taken on line 6—6 of Fig. 5 and illustrating the wings of the smaller airplane, the trapeze and trapeze mechanism housed in a recess in the wing of the mother ship, the smaller airplane and trapeze being shown in lowered position in dotted lines.

Figure 1:
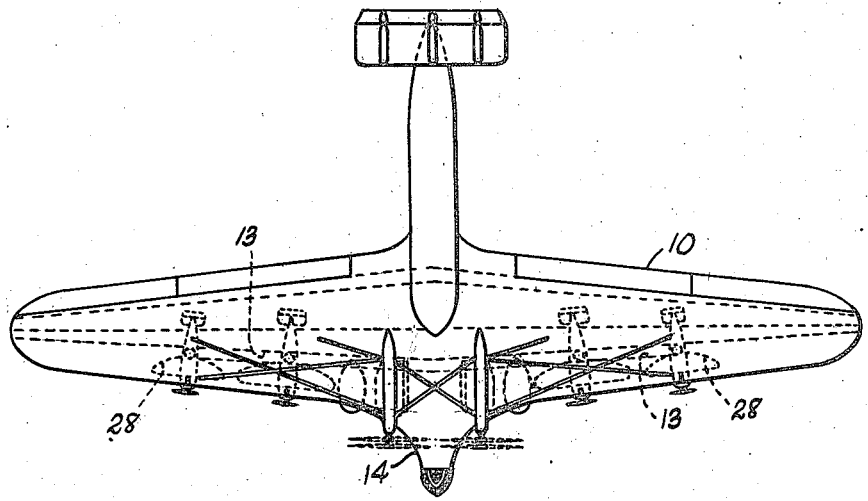
Fig. 1 is a top plan view of an aircraft carrier or mother ship, the smaller airplanes being shown in dotted lines in the wings as well as the passageway from the fuselage of the mother ship to each of the smaller planes.
Figure 2:
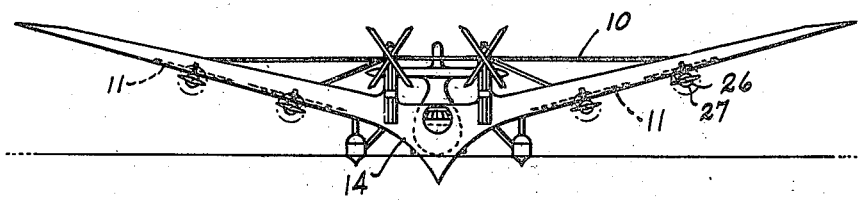
Fig. 2 is a front elevational view of Fig. 1 and illustrating in dotted lines, the position of the smaller craft in the wings of the mother craft.
Figure 3:
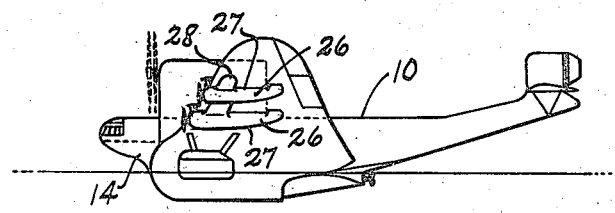
Fig. 3 is a side elevational view of Fig. 1 and illustrates portions of the smaller craft protruding from the wings of the mother craft.

Referring to the drawings, the numeral 10 represents a flying aircraft carrier or mother ship of the heavier-than-air type. Within the wings of the ship 10 are a plurality of recesses 11 and 12, the recesses 11 in each wing communicating with a passageway 13 that communicates with the fuselage 14. An air lock door 15 is hingedly mounted at the entrance of the passageway in each recess 11. Within a portion of recesses 11 at 16 there is mounted lifting and lowering mechanism that comprises cables 17 trained around suitable pulleys 18, one end of the cable being connected to suitable mechanism (not shown) in the fuselage of the mother ship and well known in the art. The other end of cable 17 is connected to one end of a trapeze 19 of rigid construction, the opposite end 20 of the trapeze being pivotally mounted to the wing of the mother ship at 21. Also connected to the trapeze 19 is a cable 22 for assisting in holding the trapeze when in lowered position rigidly. The trapeze is provided with steps or rungs 23 providing means for ingress and egress from the smaller ships carried by the mother ship. Coacting with the trapeze is a suitable hook 24 at the trailing end of a harness 25, the harness being rigidly secured to the fuselage 26 of a heavier-than-air fighter plane 27. As illustrated in Figs. 5 and 6 the wings 28 of the smaller ships, and the trapeze, are housed in recesses 11, the elevating and lowering planes 29 and the vertical rudder 30 are housed in recesses 12.

In actual use, pilots leave the fuselage 14 and enter the passageways 13, doors 15 are opened providing ingress to the recesses 11 and to the cockpits of the smaller craft. The pilots before entering the cockpits close the doors 15, the doors preventing air from entering the passageways 13. The cables 17 are put in motion from suitable mechanism (not shown) in the mother ship and the trapeze 19 to which the harness 25 is detachably secured, is lowered to a predetermined distance below the motor ship.

While I have shown and described the preferred embodiment of my invention, I wish it to be understood that I do not confine myself to the precise details of construction herein set forth by way of illustration, as it is apparent that changes and variations may be made therein, by those skilled in the art, without departing from the spirit of the invention or exceeding the scope of the appended claims.

The invention described herein may be manufactured and used by or for the Government of the United States of America for governmental purposes without the payment of any royalties thereon or therefor.

I claim:

1. An aircraft carrier of the heavier-than-air type having wings and a fuselage, recesses in the lower surface of the wings for receiving the wings of smaller aircraft, smaller recesses in the wings for receiving the rudder of smaller aircraft, a trapeze having one end pivotally mounted in each of said wing receiving recesses, a cable connected to the free end of said trapeze, passageways in the recesses in the wings of said aircraft carrier, said passageways connecting the fuselage with said wings, air lock doors in the passageway at the entrance to the fuselage, the said trapeze adapted to move into and out of the recesses in the wings of said carrier.

2. An aircraft carrier of the heavier-than-air type having wings and a fuselage, recesses in the lower surface of the wings for receiving the wings of smaller aircraft, smaller recesses in the wings for receiving the rudder of smaller aircraft, a trapeze having one end pivotally mounted in each of said wing receiving recesses, a cable connected to the free end of said trapeze, passageways in the recesses in the wings of said aircraft carrier, said passageways connecting the fuselage with said wings, air lock doors in the passageway at the entrance to the fuselage, the said trapeze adapted for engagement with smaller aircraft and for moving into and out of the recesses in the wings of said carrier.

3. An aircraft carrier of the heavier-than-air type having wings and a fuselage, recesses in the lower surface of the wings for receiving the wings of smaller aircraft, smaller recesses in the wings for receiving the rudder of smaller aircraft, a trapeze in each of said wing receiving recesses and having one end pivotally mounted, a cable connected to the free end of said trapeze, passageways in the recesses in the wings of said aircraft carrier, said passageways connecting the fuselage with said wings, air lock doors in the passageways at the entrance to the fuselage, the said trapeze adapted for engagement with smaller aircraft and for moving into and out of said recesses whereby the wings and rudder of said smaller aircraft may be moved into and out of the recesses in the wings of said carrier.

4. An aircraft carrier of the heavier-than-air type having wings and a fuselage, recesses in the lower surface of the wings for receiving the wings of smaller aircraft, smaller recesses in the wings for receiving the rudder of smaller aircraft, a trapeze in each of said wing receiving recesses and having one end pivotally mounted, a cable connected to the free end of said trapeze, passageways in the recesses in the wings of said aircraft carrier, said passageways connecting the fuselage with said wings, air lock doors in the passageways at the entrance to the fuselage, the said trapeze adapted for engagement with a harness of smaller aircraft and for moving into and out of said recesses, whereby the wings and rudder of smaller aircraft may be moved into and out of the recesses in the wings of said carrier.

DELMER S. FAHRNEY.